United States Patent [19]

Omori

[11] Patent Number: 5,675,363

[45] Date of Patent: Oct. 7, 1997

[54] METHOD AND EQUIPMENT FOR CONTROLLING DISPLAY OF IMAGE DATA ACCORDING TO RANDOM-SCAN SYSTEM

[75] Inventor: Shinji Omori, Akishima, Japan

[73] Assignee: Hitachi Denshi Kabushiki Kaisha, Tokyo, Japan

[21] Appl. No.: 226,837

[22] Filed: Apr. 13, 1994

[30] Foreign Application Priority Data

Apr. 13, 1993 [JP] Japan ................................. 5-109949

[51] Int. Cl.$^6$ ................................................. G09G 5/00
[52] U.S. Cl. ........................ 345/200; 345/190; 345/201; 345/203
[58] Field of Search ............................. 345/203, 190, 345/201, 200, 185

[56] References Cited

U.S. PATENT DOCUMENTS

| | | | |
|---|---|---|---|
| 3,683,359 | 8/1972 | Kleinschnitz | 345/196 |
| 4,766,427 | 8/1988 | Abe | 345/197 |
| 4,890,100 | 12/1989 | Kurakake | 345/196 |
| 5,311,211 | 5/1994 | Simpson | 345/185 |
| 5,367,629 | 11/1994 | Chu | 345/202 |
| 5,479,466 | 12/1995 | Kim | 345/190 |

FOREIGN PATENT DOCUMENTS

| | | |
|---|---|---|
| 62-220983 | 9/1987 | Japan . |
| 62-220984 | 9/1987 | Japan . |
| 2-61719 | 3/1990 | Japan . |

OTHER PUBLICATIONS

*Procedural Elements for Computer Graphics*, by D.F. Rogers Feb. 1987.

Primary Examiner—Richard Hjerpe
Assistant Examiner—Kent Chang
Attorney, Agent, or Firm—Antonelli, Terry, Stout & Kraus, LLP.

[57] ABSTRACT

In an apparatus for displaying image data created by a computer according to the random-scan system, until the created display data is read out and displayed, in the time of buffering a buffer memory for temporarily storing the display data, the data is divided into plural blocks based on the display coordinate information added to the display data and is thus stored. When reading the data, the data is read out and displayed in sequence from blocks adjacent to each other.

18 Claims, 14 Drawing Sheets

○: LIGHT POINT

METHOD AND EQUIPMENT FOR CONTROLLING DISPLAY OF IMAGE DATA ACCORDING TO RANDOM-SCAN SYSTEM

BACKGROUND OF THE INVENTION

1. Field of the Invention

The present invention relates to a method and an equipment for controlling the display of image data created from an image database by a computer. In particular, the invention relates to the method and the equipment for controlling display of image data so that the image data created by the computer may be displayed according to a random-scan system, which is suitable to some kinds of simulators such as a driving simulator for a vehicle and a flight simulator.

2. Description of the Related Art

FIGS. 1 and 2 are block diagrams showing prior art equipment for controlling display of image data created from an image database by a computer.

This equipment for controlling display of image data is for displaying, in combination, image data to be displayed according to the random-scan system and image data to be displayed according to the raster-scan system in the image data created on the image database by a computer.

In FIG. 1, the host CPU (Central Processing Unit) 31 provided with an image database extracts only the data required for displaying an image in the display unit 30 and feeds the data to a data processing unit 32. The data processing unit 32 performs some operations such as geometry transform and rendering with respect to the image data.

Herein, the geometry transform and the rendering will be briefly described below.

To display a figure (building, person, animal or the like) defined on the computer in a two-dimensional display unit, this figure is required to be defined as a set of polygons (in general, triangles) in a three-dimensional space coordinate system. To cubically display the figure in the two-dimensional display unit based on the three-dimensional information, when the figure (defined in the three-dimensional coordinate system) is viewed from a certain point of view, the form, the size, the brightness and the color of the viewed figure are seen from a geometric positional relation of the viewpoint and the two-dimentional display unit in the three-dimensional space. In turn, rendering indicates a process of adding a color, a brightness and a texture to the inside of a polygon defined on vertex information (including coordinate values and RGB values of vertexes of the polygon) in a pixel-by-pixel manner and temporarily storing the added result before displaying it in the display unit.

The plane system processing and the rendering are described in "Procedural Elements for Computer Graphics", David F. Rogers, Nikkan Kogyo Shinbunsha, 1991, pp. 385-506, for example.

The foregoing data which is subject to the geometry transform and the rendering is temporarily stored in the buffer memory inside of the data processing unit 32 and is then displayed in the display unit 30. FIG. 3 shows an example of an image displayed on a screen 30A of the display unit 30. In the case of the display unit for a flight-simulation image as shown in FIG. 3, the image data representing a building, a runway, a road, a mountain, a field and the like is represented as plane (polygon; for example, triangle or pentagon) data composed of a set of polygons. On the other hand, the image data (referred to as light point data) representing night streets or various lights provided in an airport is displayed according to the random-scan system. The plane data and the light point data are time-divisionally displayed by the display unit 30.

The plane data or the light point data is fed from the data processing unit 32 to the display unit 30 on a proper timing.

FIG. 2 is a block diagram showing a system arranged to process the plane data displayed in a raster-scan system and the light point data displayed in a random-scan system on each flow. In the image data fed from the host CPU 31, the plane data is sent to a data processing unit 33, while the light point data is sent to the other data processing unit 34. These units 33 and 34 perform some operations such as the geometry transform and the rendering as mentioned above with respect to the corresponding data. The processed results are temporarily stored in the corresponding buffer memories (not shown). Any one of the plane-system data from the data processing unit 33 and the light point data from the data processing unit 34 is fed to the display unit 30 through the data multiplexer (MUX) 336 so that the data may be displayed on the display unit 30. As mentioned above, the light point data is displayed according to the random-scan system. Hence, it is necessary to count the time taken until an electronic beam of the display unit 30 is made stable based on a travel distance of a light point to be displayed next on the light point display system, that is, a time taken until a deflected voltage for driving an electronic beam reaches a predetermined potential (referred to as a light point travel time). It is necessary to manage the time so that the light point may be made luminous after passage of the travel time. This time management is executed in the data processing unit 32 in FIG. 1 or the data processing unit 34 in FIG. 2.

In the conventional equipment for creating a computer image as shown in FIGS. 1 and 2, as a method of processing from the image processing of light point data to the feed and display of the processed data, it is possible to take the method of storing the data in an FIFO (First-In-First-Out) memory and reading out the data in the processing sequence. As another method, it is possible to give to the light point data a flag indicating there exists in the data a light point to be displayed and check the flags in the memory in ascending or descending sequence on the coordinates of the display system when reading out the data. The ascending sequence indicates a sequence of a coordinate (Xi, Yi) like (1, 1), (2, 1), (3, 1), . . . , (n, 1), or (n, 1), (n, 2), (n, 3) . . . (n, n) or (n, 1), (n−1, 1), (n−2, 1), . . . , (1, 1), for example.

In the foregoing prior art, the image data created by a computer system for creating an image is randomly fed from the host CPU without having to follow the ascending or descending sequence of the coordinates of the display system or a certain rule. Hence, the light point data displayed according to the random-scan system is processed by the display system independently of the mutual locations on the display system.

Further, the data from the host CPU may be correlated with the corresponding location on the display system when it is output. This, however, needs a massive amount of processing such as sorting. Hence, this technique is not suitable to image generating equipment required to display an image in real time (on a frame frequency of 30 Hz, for example).

In this case, the display sequence of the light points on an airport runaway at night or the light points on the street may jump from point to point, for example, in FIG. 3, LP1, LP2, LP3, LP4, LP5, . . . , without having to display the light points around a first light point in sequence. As shown by the example, the light points may be greatly changed. As such, the display process is burdened, because a light point travel time has to be secured.

The prior art of the equipment for controlling display of image data for solving such disadvantages is disclosed in JP-A-62-220983.

In the prior art, the plane data is displayed during the scan period of the horizontal raster. The light point data is displayed during a horizontal raster scan blanking period according to the random-scan system. During the horizontal raster blanking period, the random scan means the process of generating a raster-scan defected voltage in an integer part of the location coordinate of a light point in a manner to restrict the point travel to one pixel and one scan line or lower. D/A converting the fraction part of it and feeding the converted data as a minimal random scan deflected voltage.

SUMMARY OF THE INVENTION

The equipment for controlling display of image data disclosed in JP-A-62-220983 has the following shortcomings:

Since the light point travel time is not managed until the deflected voltage for driving an electronic beam of the display unit at the random scan time reaches a stable area, the light point may be exposed in the transient response time band of the deflected voltage. In such a transient case, the light point is not displayed at an exact location, and the light point image is displayed so that it may unnaturally leave its after-image.

Moreover, if a method is used for checking the ascending sequence of flags in memory indicating whether or not the light point data is located at its coordinate location of the display system when reading the light point data from the buffer memory and reading it, the method needs to consume a massive checking time when reading the data and initialize the memory each time the display image is refreshed. The initialization takes a long time as well. These conditions restrict the number of light points to be displayed at the defined display allocation time so that the light point may be unnaturally switched on or off, which disallows the light points to be displayed with fidelity.

SUMMARY OF THE INVENTION

It is object of the present invention to provide a method and an equipment for controlling display of image data which avoid the aforementioned shortcomings that the prior art suffers from.

It is another object of the present invention to provide a method and an equipment for controlling display of image data which are arranged to reduce the processing time required to display the image data to be displayed according to the random-scan system.

According to an aspect of the present invention, there is provided a method for controlling display of image data created by a computer on a screen of a display unit for displaying the data according to a random-scan system. The method includes the steps of 1) allocating each of plural pieces of image data created by the computer in sequence to any one of blocks based on display coordinate data added to the image data and storing them in memory; and 2) reading the image data stored in the memory in sequence from more adjacent blocks on the coordinates of the screen and giving the image data to the display unit.

According to another aspect of the present invention, there is provided equipment for controlling display of image data created by a computer on a screen of a display unit for displaying the image according to the random-scan system. The equipment includes a memory for storing the image data; a writing control unit for allocating each piece of image data created by the computer in sequence to any one of plural blocks based on the display coordinate data added to the image data and storing them in the memory; a reading control unit for reading image data stored in the memory in sequence from more adjacent blocks on the coordinates of the screen; and a display control unit for controlling the display timing of image data in a manner to display the readout image data on the display unit according to the random-scan system.

According to an example of the present invention, the display control unit includes a travel time calculating unit for calculating a travel time required for an electronic beam to travel from a display location of the preceding image data to a display location of the current image data in the display unit, based on the display coordinate data added to the current image data and the display coordinate data added to the preceding image data, both being read from the readout unit; and a control unit for controlling an exposure operation for displaying the current image data after passage of the calculated travel time. This display control unit provides a function for measuring and managing a light point travel time (meaning a time taken until the electronic beam of the display unit is made stable/a time taken until the deflected voltage for driving the electronic beam is made stable).

The present invention is arranged to allocate the data into blocks based on the location information of the display system added to the data when buffering the data into the buffer memory for temporary storage thereof, processed by the data processing equipment until the data is read out and displayed and to read the data in sequence from more adjacent blocks when reading the data.

As such, the display data is stored in the buffer memory with their display locations being adjacent to one another. In reading out the data, the displayed image data have the location adjacent to each other since the data is read out in sequence from more adjacent blocks. Hence, the display switching time is reduced and the number of image data pieces to be displayed at a unit time is increased so as to display the image with more fidelity.

DESCRIPTION OF THE PREFERRED EMBODIMENTS

Hereafter, the description will be oriented to equipment for controlling display of image data according to an embodiment of the present invention with reference to the appended drawings.

Figure 1:
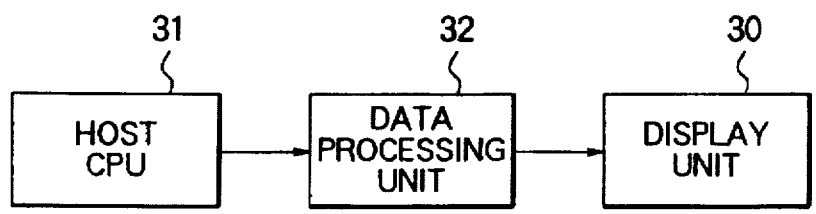
FIG. 1 is a block diagram showing a-prior art equipment for controlling display of image data.
Figure 2:
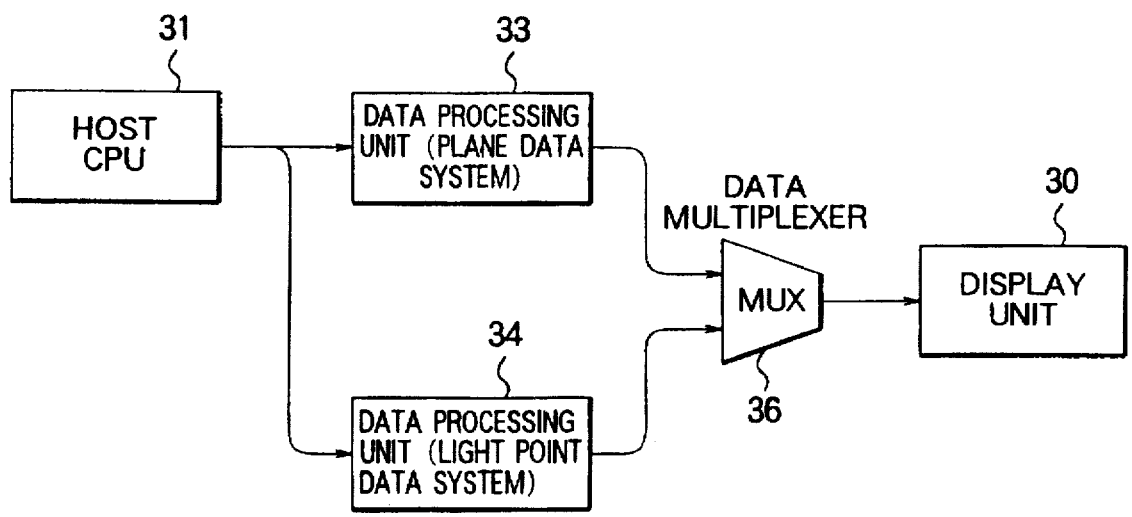
FIG. 2 is a block diagram showing another prior art equipment for controlling display of image data.
Figure 4:
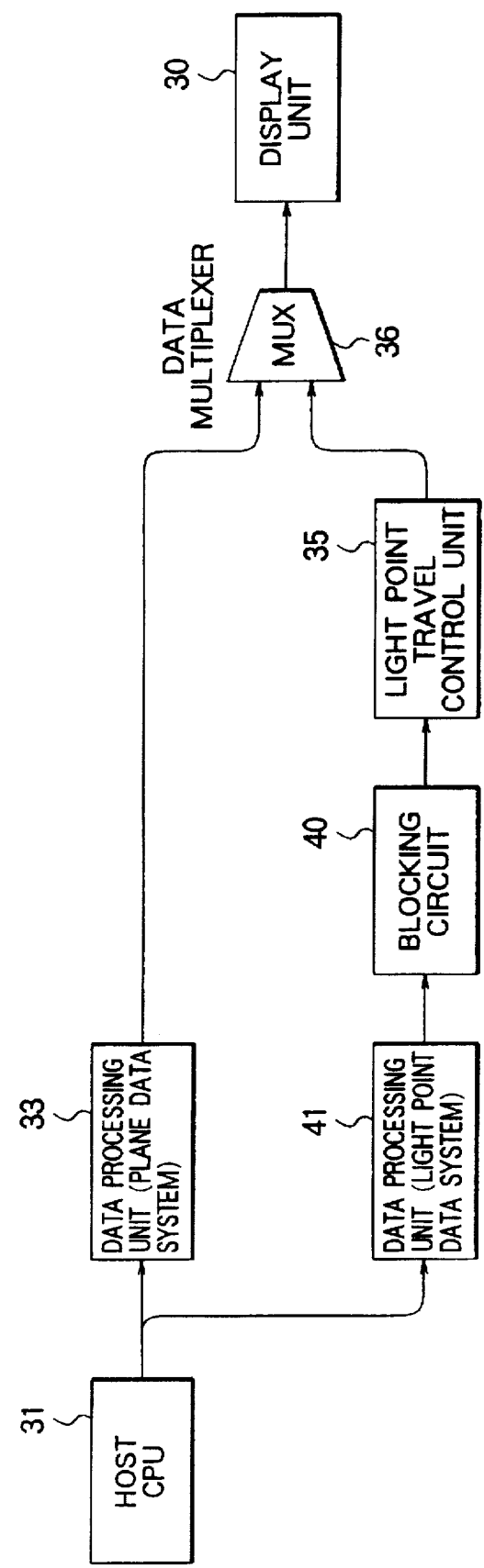
FIG. 4 is a block diagram showing an arrangement of equipment for controlling display of image data according to an embodiment of the present invention.

FIG. 4 is a block diagram showing an arrangement of an equipment for controlling display of image data according to an embodiment of the present invention. In this figure, the components functioning similarly with those shown in FIGS. 1 and 2 have the same reference numbers and are not described herein.

In this embodiment, like the foregoing data processing unit 34, a data processing unit 41 performs some operations such as geometry transformation and rendering with respect to the light point data sent from a host CPU 31 and immediately sends the processed data to a blocking circuit 40. The blocking circuit 40 serves to divide the light point data into blocks based on the upper l (an integer equal to or more than 1) bits and the upper m (an integer equal to or more than 1) bits so that each group of light points may have the adjacent locations to one another. The light point data is stored in a buffer memory provided in the blocking circuit 40. When reading the light point data, the blocking circuit 40 reads the data in sequence from more adjacent blocks to each other and sends it to a light point travel control unit 35 in the reading sequence. The light point travel control unit 35 serves to measure (operate) and manage a light point travel time (a time taken until an electronic beam of a display unit is made stable/a time taken until a deflected voltage for driving an electronic beam is made stable), that is, a time required for the electronic beam to travel to the next light point location on the display unit 30. Under the measurement and management, the light point data from the blocking circuit 40 is sent to the display unit 30 through a multiplexer (MUX) 36 so as to control the timing and the time duration when the light points are made operative based on the light point data.

Later, the description will be oriented to the arrangement and the operation of the blocking circuit 40 and the light point travel control unit 35.

Figure 5:
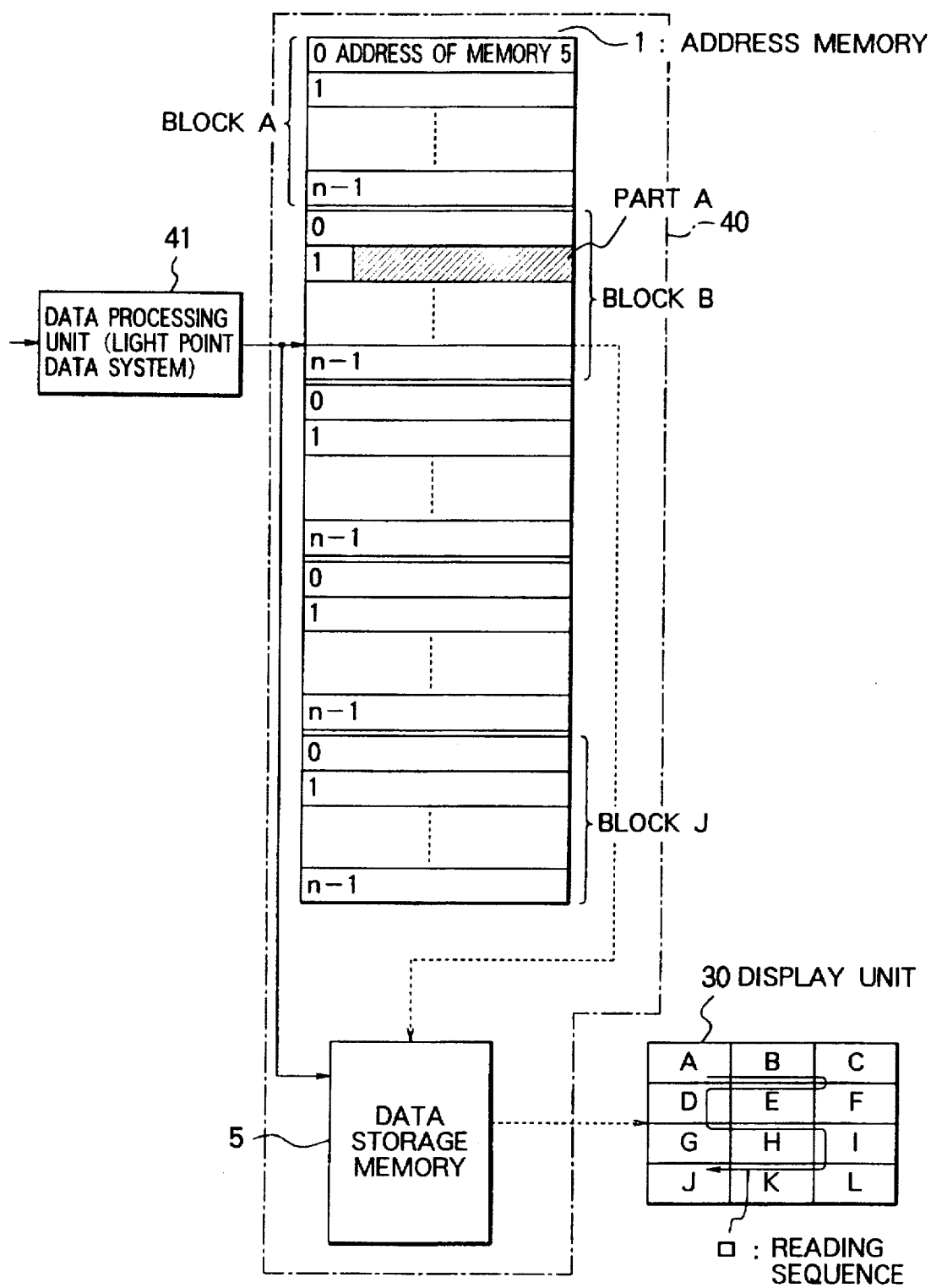
FIG. 5 is a block diagram illustrating the concept of a blocking circuit included in the embodiment shown in FIG. 4.

At first, an embodiment of the blocking circuit 40 will be described with reference to FIGS. 5 and 6. FIG. 5 is a block diagram showing the concept of the blocking circuit 40.

In FIG. 5, the data processing unit 41 operates to randomly output the light point data consisting of the X and Y coordinates and the information added to the coordinates irrespective of where the light points are located. Number 5 denotes a data storage memory serving as a buffer memory, which stores the X and Y coordinates and the proper data (information added to the X and Y coordinates) of each light point. Number denotes an address memory, which is divided into blocks A to L (12 sections) so as to correspondingly divide the screen of the display unit 30 into 12 parts. Therefore, the memory is blocked based on the upper bits of the X and Y coordinates indicating the location of the light point contained in the light point data. The technique of dividing the data into blocks based on the upper bits pointing to the coordinate is discussed in JP-A-2-61719, hence, the technique is not discussed here. The address memory 1 stores the information about an address of the data storage memory 5 in which the light point data is written, specifically, the address itself. The display unit 30 may use a CRT, a video projector or a laser scanner.

Next, operation of the blocking circuit 40 shown in FIG. 5 will be discussed more specifically.

The data processing unit 41 operates to randomly output the light point data processed by the geometry transformation or the rendering, irrespective of where the light point is displayed (X and Y coordinates). This light point data is composed of X and Y coordinates indicating where the light points are two-dimensionally located and the information added to the coordinates (color, brightness, and size).

The light point data composed of the X and Y coordinates and the information added to the coordinates is sent from the data processing unit 41 to the data storage memory 5. On the other hand, the data (address information), that is, the data indicating which of the address of the data storage memory 5 the light point data is written, is written in an address of a block composed of the upper bits of the X and Y coordinates of the address memory 1.

Figure 3:
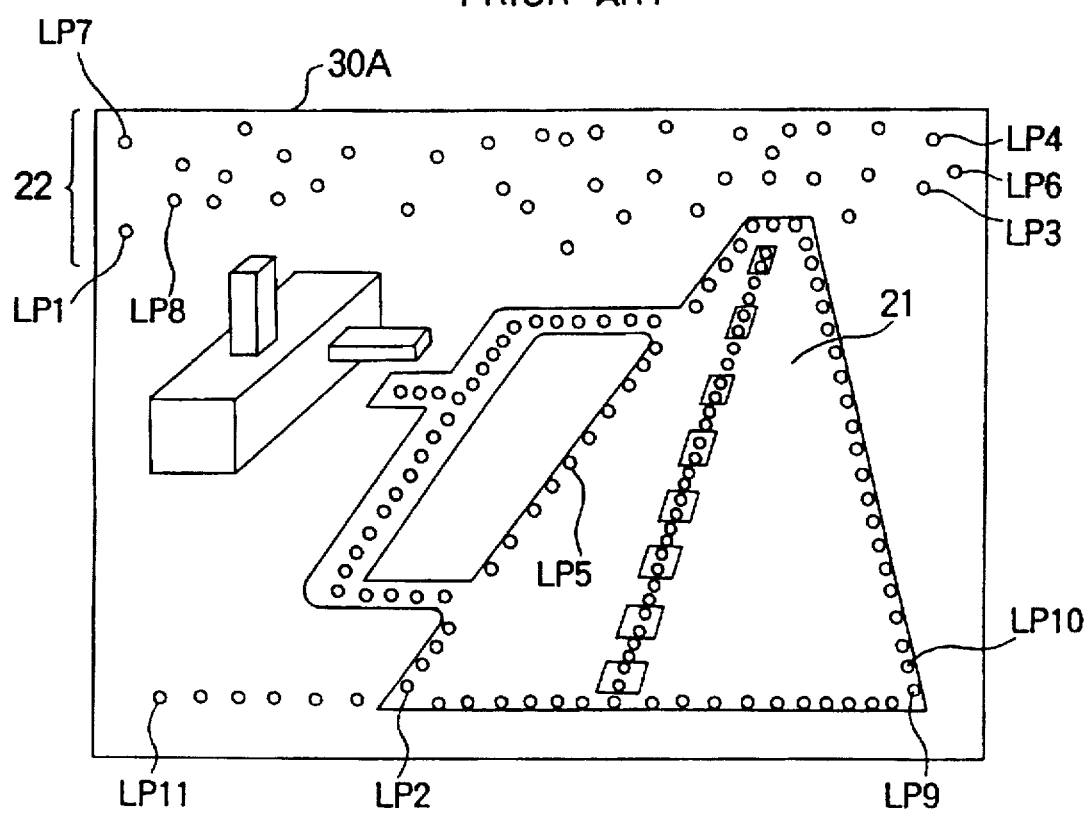
FIG. 3 is a view showing a display example of a display unit to which the present invention applies.

For example, consider certain light point data. If the display location (X and Y coordinates) of the light point in the display unit 30 belongs to a block B and the light point corresponds to the second data in the block B, in the part A shown by oblique lines of the block B of the address memory 1 in FIG. 5, there is written the data (address information) indicating which of an address of the data storage memory 5 the data (light point data) about the light point is stored. To read out the content of the memory, on the condition that the display unit 30 shown in FIG. 5 is divided into A, B, C, D, . . . . . K and L blocks, a control unit (not shown) operates to create such block addresses as allowing the blocks to be read in sequence from more adjacent blocks like the blocks A, B, C, F, E, D, G, H, I, L, K and J and light point addresses in the blocks. Then, the address memory 1 is addressed so as to read out the address information of the data storage memory 5 where the light point data is stored. According to the address information read out of the address memory 1, the memory 5 is addressed so as to read out the light point data. Specifically, refer to the display screen shown in FIG. 3. The light points are read out in the sequence of LP1, LP7, LP8, . . . , LP9, LP10, and finally LP11 located at the block J. Then, the processing of one screen is terminated. The size of each light point is represented by defocusing. To enlarge the size of a light point more, only the light point may be partially raster-scanned.

Next, the arrangement and the operation of the blocking circuit 40 shown in FIG. 5 will be discussed in more detail with reference to FIG. 6. FIG. 6 is a block diagram showing a more specific arrangement of the embodiment shown in FIG. 5.

Figure 6:
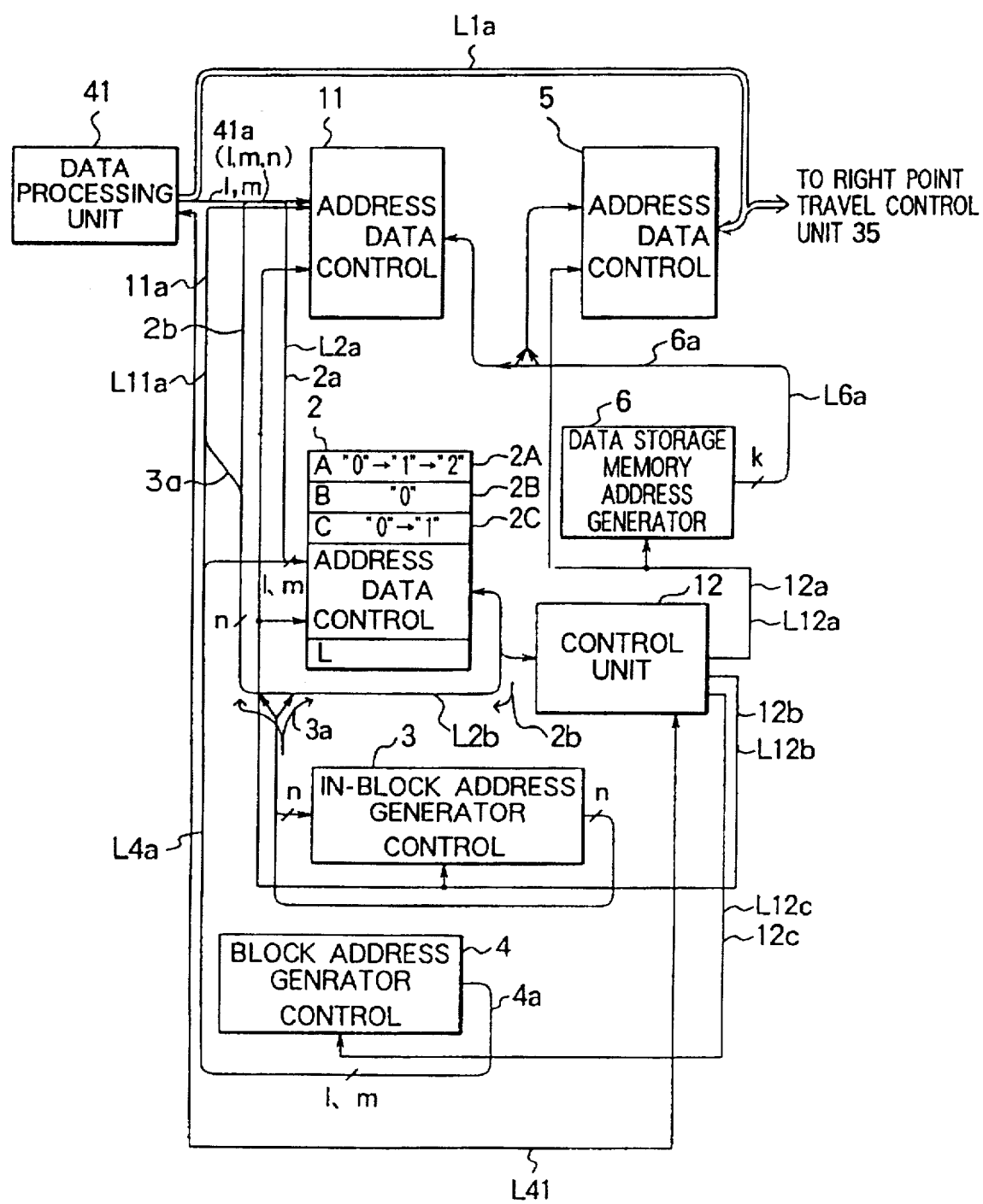
FIG. 6 is a block diagram showing an embodiment of a blocking circuit included in the embodiment shown in FIG. 4.

In FIG. 6, a numeral 41 denotes a data processing unit, like the arrangement of FIG. 5, for randomly outputting the pre-processed light point data. Number 11 denotes an address memory corresponding to the address memory 1 in FIG. 5. Number 2 denotes a memory for storing an in-block data count (in-block data count memory), the memory storing information 2b of a counted number of light point data in each of the blocks A to L formed by dividing the display screen by a factor of 12 along the X and Y axes. The information 2b also serves as information of the address memory 11 indicating at which location of the blocks in the address memory 11 the light point data is stored. Number 3 denotes an in-block address generator which generates an in-block address 3a from the information of the in-block data count. A Number 4 denotes a block address generator which generates a block address 4a when the light point data is read out of the data storage memory 5. Number 5 denotes a data storage memory for storing the light point data output from the data processing unit 41 at random as mentioned above. Number 6 denotes a data storage memory address generator which generates an address information 6a used for storing the light point data in the data storage memory 5. Number 12 denotes a control unit for controlling the in-block address generator 3, the block address generator 4, the data storage memory 5, and the data storage memory address generator 6.

The block of the in-block data count memory 2 is uniquely defined by the address information 2a composed of 1 and m bits.

Further, L12a, L12b and L12c denote control lines through which control data 12a, 12b, 12c are transmitted from the control unit 12 to each set of the components 5, 6, 2, 3, 11;4. L1a denotes a data bus through which the light point data is transmitted. L11a, L2a and L6a denote data lines through which address information 11a, 2a, 6a are transmitted. L2b denotes a data line through which information 2b regarding an in-block data count is transmitted. L4a denotes a data line through which block address information 4a is transmitted.

In addition, L41 denotes a signal line through which a signal from the data processing unit 41 is transmitted to the control unit 12 or the signal is transmitted from the control unit 12 to the data processing unit 41.

Next, the description will be oriented to the writing operation of the blocking circuit 40 with reference to FIG. 6.

The data processing unit 41 sends a data enable signal, for example, to the control unit 12 through the signal line L41 before sending the light point data to the blocking circuit 40 through the data bus L1a in each frame. As such, the control unit 12 sends control data 12a to the data storage memory 5 and the data storage memory address generator 6 through the control line L12a in response to the first data enable signal in a certain frame and sends the control data 12b to the address memory 11, the in-block data count memory 2, and the in-block address generator 3 through the control line L12b, which are put into the writing mode. Further, the control unit 12 sends the control data 12c to the block address generator 4 through the control unit L12c so as to put the generator 4 into an inoperative state. Then, the data processing unit 41 randomly outputs the light point data composed of the X and Y coordinates and the information added to the coordinates to the data bus L1a irrespective of the X and Y coordinates of the light point. The data processing unit 41 sends the address information 2a composed of the upper 1 bits of the X coordinate and the upper m bits of the Y coordinate to the address memory 11 and the in-block data count memory 2 through the data line L2a. The memory 2 serves to give to the address memory 11 and the in-block address generator 3 the information 2b (n bits) about the data count (number of data items stored in each block) of the block uniquely corresponding to the address information 2a. The address generator 3 latches the in-block data count information 2b. As such, the address memory is addressed by address information 41a composed of l, m and n bits. Further, the control unit 12 sends a control signal to the address generator 6 through the control line L12a in response to the data enable signal so that the address generator 6 may give the address information 6a composed of k (k: integer) bits to the memories 5 and 11. With this address information 6a, the memory 5 is addressed so that the light point data on the data bus L1a may be stored in the area indicated by the address information 6a of the memory 5. On the other hand, the address memory 11 is addressed by the address information 2a composed of the upper l and m bits of the X and Y coordinates of a light point from the data processing unit 41 and the address information 41A composed of the in-block data count 2b from the in-block data count storage memory 3. The in-block data count information 2b read out of the in-block data count storage memory 2 by the above address information 2a is served as new in-block data count value information 3a composed of n (integer) bits in the generator 3. The information 3a is stored in an area of an address of the corresponding block (corresponding to the X and Y coordinates represented by l and m bits) of the memory 2. This is a process of counting pieces of light point data contained in the block. The address information 6a is stored in the area indicated by the address information 2a and 3a. Hence, this is equivalent to the storage of the light point data stored in the data storage memory 5 as data of the memory 5. Accordingly, the light point data is written in the memory 5 in response to the address information 6a. The writing address information 6a of the memory 5 is stored in the memory 11.

Next, the description will be oriented to the operation of the in-block data count memory 2 and the in-block address generator 3. The above description has stated the operation of the in-block data count by referring to the specific numerical values. This operation is executed immediately after the process of storing one piece of light point data in the data storage memory 5 in response to the address information 6a and storing the address information 6a of the light point data in the address memory 11. In the memory 2, the block to which the light point data belongs is uniquely defined on the address information 2a composed of the l and m bits. For example, the address information 2a is the first one at the write mode. If it belongs to the block A, an initial count value "0" in the corresponding area 2A to the block A is read out and the data count information 2b indicating the count value "0" is given to the address generator 3. In the address generator 3, the count value "0" is incremented by 1 so as to raise it to "1". The count value "1" is output as the address information 3a. Then, the memory 2 operates to rewrite the count value "0" of the area 2A with the count value "1" of the information 3a. Next, if the light point data belongs to the block A, similarly, the memory 2 operates to give the count value "1" of the area 2A as information 2b to the address generator 3. The address generator 3 increments the count value to "2" and outputs it as the address information 3a. As a result, the count value in the area 2A is changed to "2". If the light point data belongs to a block C, for example, the memory 2 writes the count value "1" in the area 2C corresponding to the block C according to the address information 3a. At this time, the count values of the areas 2A, 2B and 2C are "2", "0" and "1", respectively, which indicate two pieces, 0 pieces and one piece of light point data in the blocks A, B and C, respectively. These count values are used when reading the light point data in the memory 5 as described below.

The control unit 12 operates to control the address generator 6 in a manner to generate a new address each time the data enable signal is input from the data processing unit 41.

Along the operation described above, all of the light point data of one frame is written from the data processing unit 41 to the memory 5. The written address is stored in the memory 11. The data processing unit 41 gives a flag indicating termination, for example, to the control unit 12 through the signal line L41. In response, the control unit 12 operates to send the control data 12a to the data storage memory 5 through the control line L12a, the control data 12b to the address memory 11, the in-block data count memory 2 and the in-block address generator 3 through the control line L12b, and data control 12c to the block address generator 4 through the control line L12c, so that those components may be put into the reading mode. Further, the control unit 12 operates to send the control data 12a to the data storage memory address generator 6 through the control line L12a so that the generator 5 may be made inoperative. Then, the control unit 12, for example, starts to read the light point data written in the memory 5 in response to a vertical or horizontal synchronous signal (not shown).

Later, the description will be oriented to the reading operation of the light point data.

At first, the control unit 12 sends a control signal to the block address generator 4 through the control line 12c in response to a vertical or a horizontal synchronous signal, for example. In response, the generator 4 generates the block address information 4a consisting of 1 and m bits, for example, address information corresponding to the block A, and sends it to the in-block data count memory 2 through the signal line L4a for addressing the memory 2. Then, the memory 2 starts to read a count value n (for example, "2" in the above embodiment) and sends it as the data count information 2b to the control unit 12 and the in-block address generator 3. In response, the generator 3 decrements the count value n ("2", for example) by only 1 for obtaining a count of nΔ1 ("1", for example) and gives the value of n−1 as the information about the in-block data count value to the memory 2. The count value n of the area 2A is rewritten with the count value n−1. Then, the generator 3 gives the information 3a as the address information 11a to the address memory 11 together with the block address information 4a for addressing the memory 11.

The address memory 11 is addressed by the address information 11a composed of the block address information 4a and the in-block data count 3a so as to read out the address information 6a and transmit it from the data terminal of the address memory 11 to the address terminal of the data storage memory 5 for addressing the memory 5. Hence, the light point data of the corresponding block A (that is, the second light point data stored in the address "1" of the block A written in the writing time) is read out and then given to the light point travel control unit 35 through the data bus L1a. This is the end of one piece of light point data.

In order to read the next light point data, the control unit 12 sends the control signal to the generator 4. A predetermined time later, the generator 4 sends the block address information 4a as described above, that is, the address information of the block A to the memories 2 and 11. Hence, from the memory 2, the count value n−1 ("1", for example) of the area 2A of the block A is read out and is then sent as the data count information 2b to the control unit 12 and the in-block address generator 3. In response, the generator 3 decrements the count value n−1 by only 1 for obtaining a count value of n−1 ("0", for example). Then, the count value n−1 is given as the information 3a regarding the in-block data count value to the memory 2. The count value n−1 of the area 2A is rewritten with the count value n−2, that is, the initial value "0". Then, the generator 3 gives the information 3a as the address information 6a with the block address information 4a to the address memory 11 for addressing the memory 11.

Hence, when the address memory 11 is addressed in response to information 4a and 3a, the address information 6a corresponding to information 4a and 3a (that is, the count value n−2 of the block A) is read out of the memory 11 and is then given to the memory 5 for addressing the memory 5. As such, from the memory 5, the light point data of the block A (that is, the first light point stored at the address "0" of the block A written in the writing time) is read and is then given to the light point travel control unit 35.

As described above, all of the light point data of the block A is read out. As mentioned above, the control unit 12 receives the information 2b pointing to n−1 (="0") (that is, the information indicating that it is the last light point data in the corresponding block). Hence, the control unit 12 determines that reading of the light point data in the block A is terminated and gives the control signal 12c to the block address generator 4 so as to output the address information of the next block, that is, the block address information 4a corresponding to the block B. In response, the memory 2 operates to output the count value n ("0", for example, that is, the initial value) of the area 2B of the block B as the information 2b. Based on the information 2b, the generator 12 determines that no light point data exists in the block B and gives the control signal 12c to the block address generator 4 so as to output the block address information 4a corresponding to the next block C.

In addition, in response to the information 3a, the control unit 12 may control the block address information 4a from the block address generator 4. In addition, in FIG. 6, address information 41a and 11a are given to the memory 11 on respective data lines, for the descriptive convenience. Accordingly, this information may be fed on a common data line.

Along the above operation, as in FIG. 5, the light point data from the blocks A, B, C, F, E, D, G, H, I, L and K are read out of the memory 5 in sequence. When reading of the light point data of the block J is terminated, the control unit 12 sends a signal to the data processing unit 41 through the signal line L41 so that it reads out the light point data of the next frame from the data processing unit 41. In response, the data processing unit 41 gives a data enable signal to the control unit 12 and starts to write the light point data of the next frame.

Figure 7:
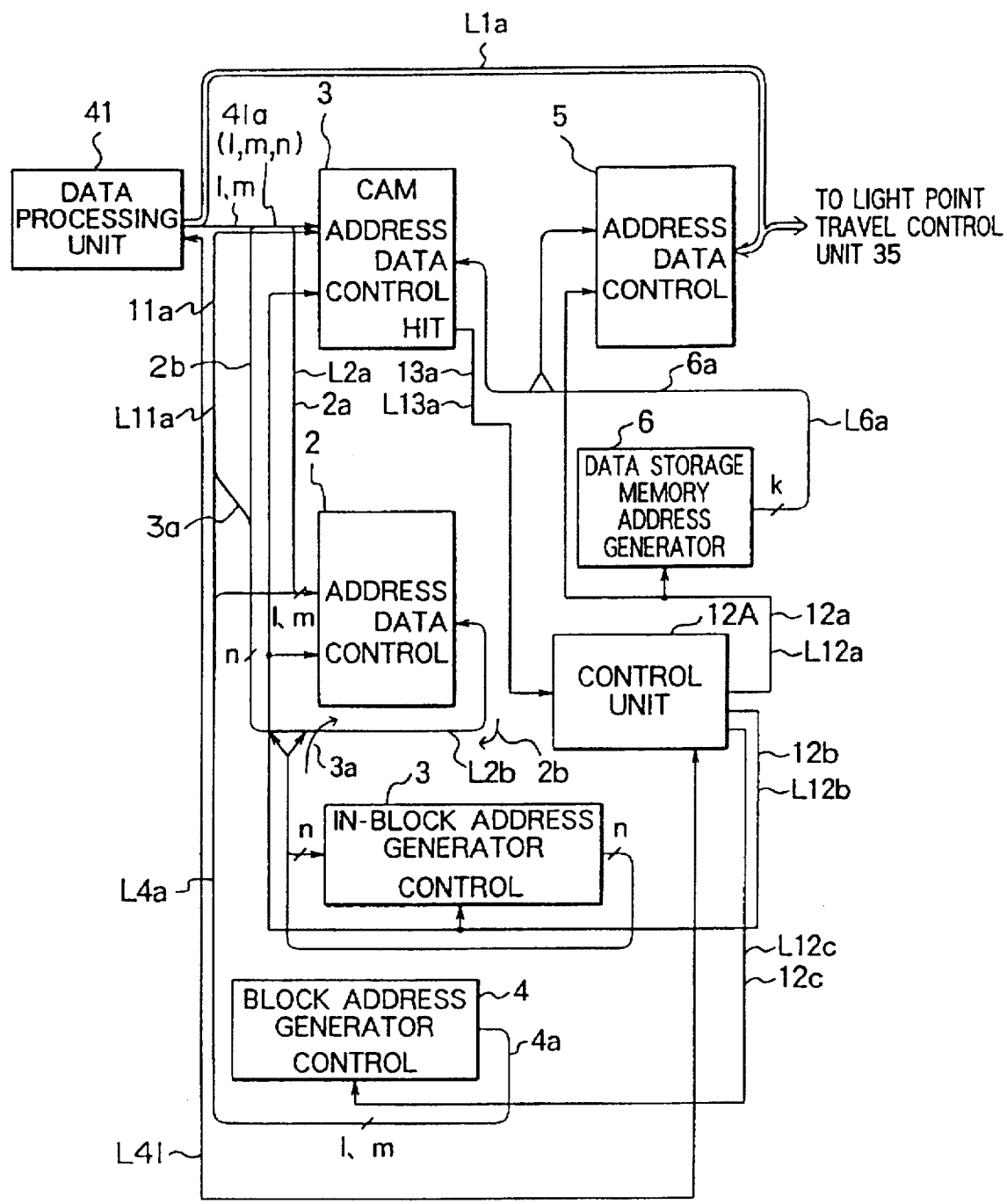
FIG. 7 is a block diagram showing another embodiment of a blocking circuit included in the embodiment shown in FIG. 4.

Next, another embodiment of the blocking circuit 40 will be described later with reference to FIGS. 7, 8 and 9. FIG. 7 is a block diagram showing another embodiment of the blocking circuit 40, in which the same components having the same functions as those shown in FIG. 6 have the same reference numbers and thus are not described herein.

In this embodiment, a content addressable memory is used in place of the address memory 1 shown in FIG. 5. The address memory described in FIGS. 5 and 6 is a conventionally used normal memory which has a function of decoding the address information in the row and the column directions, addressing the internal memory cell, and reading or writing the data. Hence, as shown in FIG. 5, it is necessary to divide the address memory into plural blocks for controlling the memory. On the other hand, rather than using the normal address memory in the embodiment of FIG. 7, the content addressable memory (referred to as a CA memory) is used for composing the address memory. This memory keeps the block address information and in-block address information in its comparator memory, which makes it possible to do blocking management of the memory itself without having to divide the memory into blocks. Specifically, when the address information is fed to the CA memory in reading the data, it is determined whether or not the memory holds the same bit pattern as the address information at that time and outputs the information indicating "hit" and the data added to the information if any. FIG. 8 is an explanatory view showing how this CA memory operates to write the data. FIG. 9 is an explanatory view showing how the CA memory operates to read out the data.

Figure 8:
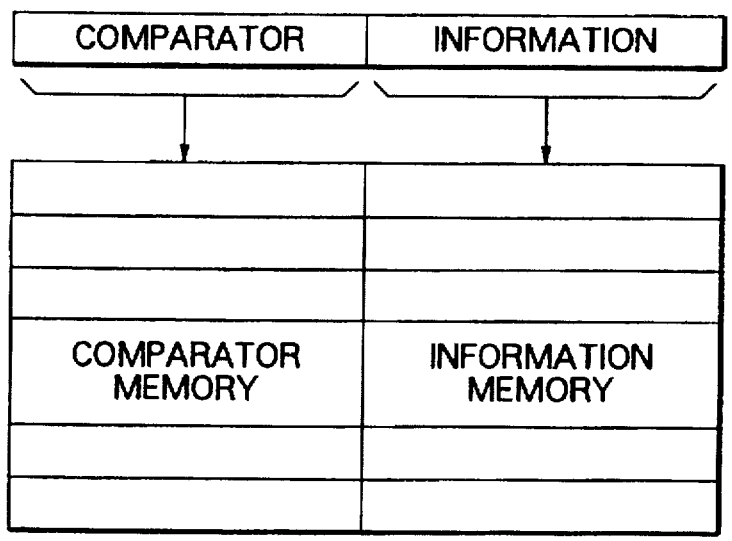
FIG. 8 is a view illustrating an operation of writing data in a content addressable memory shown in FIG. 7.
Figure 9:
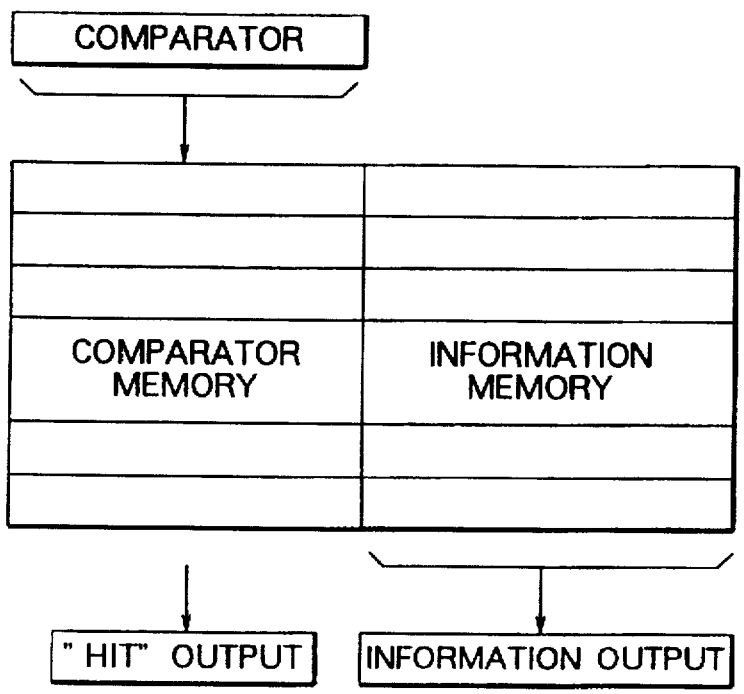
FIG. 9 is a view illustrating an operation of reading data from a content addressable memory shown in FIG. 7.

As shown in FIGS. 8 and 9, this memory provides a comparator memory and an information memory. In this memory, a pair of a comparator and information is stored in any location of the memory. In reading the data, the comparator data (address information) to be fed is processed as bit patterns and is simultaneously compared with all of the bit patterns in the comparator memory. If the same bit pattern is found out, the information about "hit" is output from the CA memory. Then, the CA memory operates to output the information in the information memory corresponding to the comparator data of the "hit" bit pattern. In this embodiment shown in FIG. 7, this address memory 13 treats 1, m and n bit patterns of the address information 41a as the comparator data and k-bit data of the address information 6a as information.

Later, the description will be oriented to how this embodiment operates if this CA memory is used with reference to FIG. 7. In this figure, a numeral 12A denotes a control unit for controlling an operation of each memory and each component. A numeral 13 denotes an address memory for storing an address of the data storage memory 5, which uses a CA memory. A numeral 13a denotes bit information given from the address memory 13 to the control unit 12A.

In this embodiment, though the function of the control unit 12A is substantially same as the control unit 12 of FIG. 6, the information input to the control unit 12 is only a signal from the data processing unit 41 and the information indicating "hit" given from the "HIT" terminal of the CA memory 13 through the data line L13.

Then, this operation of the embodiment will be described. The operation of storing the light point data in the memory 5 is the substantially same as the operation of the storage of the embodiment of FIG. 6. Hence, the brief description will be expanded.

The light point data is randomly output onto the data bus L1a from the data processing unit 41. This light point data is stored in the data storage memory 5 to be addressed by the k-bit address information 6a created in the data storage memory address generator 6. Then, the in-block data count memory 2 is addressed by the address information 2a composed of the upper l bits of the X coordinates and the upper m bits of the Y coordinates of this light point data in a manner to read the information 2b about an in-block data count and feed it to the memory 13 and the in-block address generator 3 for latching it.

Along this operation, the CA memory 13 stores in concert the n bits of the in-block data count information 3a, the block address information 41a (that is, l and m bits) composed of the upper l bits of the X coordinate and the upper m bits of the Y coordinates, and the address information 6a corresponding to the data of the memory 13. Then, the latched in-block data count information 2b is incremented by +1 in the in-block address generator 3. The n bits of the resulting new in-block data count information 3a are written in the same address of the in-block data count memory 2.

The foregoing operation is a process for blocking one light point data. This process is repeated regarding all of the light point data for one frame, and then the writing operation is terminated.

Next, the reading of the light point data for displaying it will be performed as follows.

At first, like the foregoing embodiment, the control unit 12A sends a control signal to the block address generator 4 through the control line 12c in response to a vertical or horizontal synchronous signal, for example. In response, the generator 4 generates the block address information 4a composed of the l and the m bits, that is, the address information for the block A, for example, in the ascending or descending block number sequence and sends the address information to the in-block data count memory 2 through the signal line L4a for addressing the memory 2.

The n bits of the in-block data count are read into and held in the in-block address generator 3. These n bits are read from the in-block data count memory 2 addressed by the block address information 4a. The address information 11a composed of this n-bit information and the l and m bits of the block address information 4a is fed to the CA memory 13. This CA memory 13 retrieves this address information 11a if it is stored in the memory itself through the effect of the bit pattern. If found, the CA memory 13 serves to output the "hit" information 13a to the control unit 12A.

In receipt of this "hit" information, the control unit 12A operates to keep the current block address information (for the block A, herein) in the block address generator 4. The memory 13 outputs the address information 6a paired with the address information 11a at a time. With this address information 6a, the data storage memory 5 is addressed so that the light point data for the block A to be displayed may be read out of the data storage memory 5. The foregoing operation is a process for reading one piece of light point data from the memory 5.

In response to the "hit" information 13a, the control unit 12A sends the control data 12b and 12c to the memory 2 and the block address generator 4, respectively. In response, the generator 4 outputs the same information (for the block A, for example) as the above as the block address information 4a. Further, the in-block data count memory 2 sends to the in-block address generator 3 the in-block data count information 2b stored in the area 2A for the block A. The generator 3 serves to decrement the information 2b by only 1 and then to send to the memory 2 the n bits of the resulting new in-block data count information 3a for rewriting the information of the area 2A. Then, the n bits are also sent to the memory 13 together with the block address information 4a. With the above operation, the memory 13 is addressed. While the "hit" information 13a is being obtained from the CA memory 13, the foregoing operation is executed so as to sequentially read out the light point data for the block A.

On the other hand, if no "hit" information 13a is obtained from the memory 13 within a predetermined time though the address information 11a obtained by the output of the control data 12b and 12c is fed to the memory 13, the control unit 12A operates to determine that no data exists in the block indicated by the block address information 4a or that reading of all the data in the block is terminated by the foregoing reading process.

As such, the control unit 12A sends to the generator 4 the control data 12c for updating the block address information 4a. This information is used for reading the data from the next block (that is, the block B). In response to the control data 12c, the generator 4 outputs the block address information 4a for the next block B. Then, reading of the information for all of the blocks is performed by the similar operation.

In the state of reading the last block (that is, the block J in FIG. 5), if no "hit" information 13 can be obtained from the memory 13 within a predetermined time though the address information 11a obtained by outputting the control data 12b and 12c is given to the memory 13 as mentioned above, the control unit 12A operates to determine that reading of the information from all the blocks is terminated and sends a signal to the data processing unit 41 in order to read the light point data of the next frame from the data processing unit 41.

In addition, the control unit 12A can grasp the current block to be processed (read) by counting the update control data 12c of the block address information 4a given to the generator 4.

The above operation applies to the embodiment in which the content addressable memory 12 is used in place of the address memories 1 and 11. In comparison with the embodiment shown in FIG. 6, the volume of the address memory is greatly reduced. For example, the embodiment shown in FIG. 6 needs a volume of $2^{l+m+n} \times k$ bits, while the embodiment shown in FIG. 7 needs only a volume of $(l+m+n+k) \times 2^k$.

In the embodiments shown in FIGS. 6 and 7, the control unit 12A operates to read the light point data stored in the memory 5 in response to a data enable signal sent from the data processing unit 41. The reading operation may be executed in response to the data enable signal given from the data processing unit 41 to the control unit 12A based on the signal given from the control unit 12A to the data processing unit 41. In addition, the blocking circuit 40 shown in FIGS. 6 and 7 may be composed of a wired logic circuit, while the control unit 12A may be composed of a microcomputer.

Figure 10:
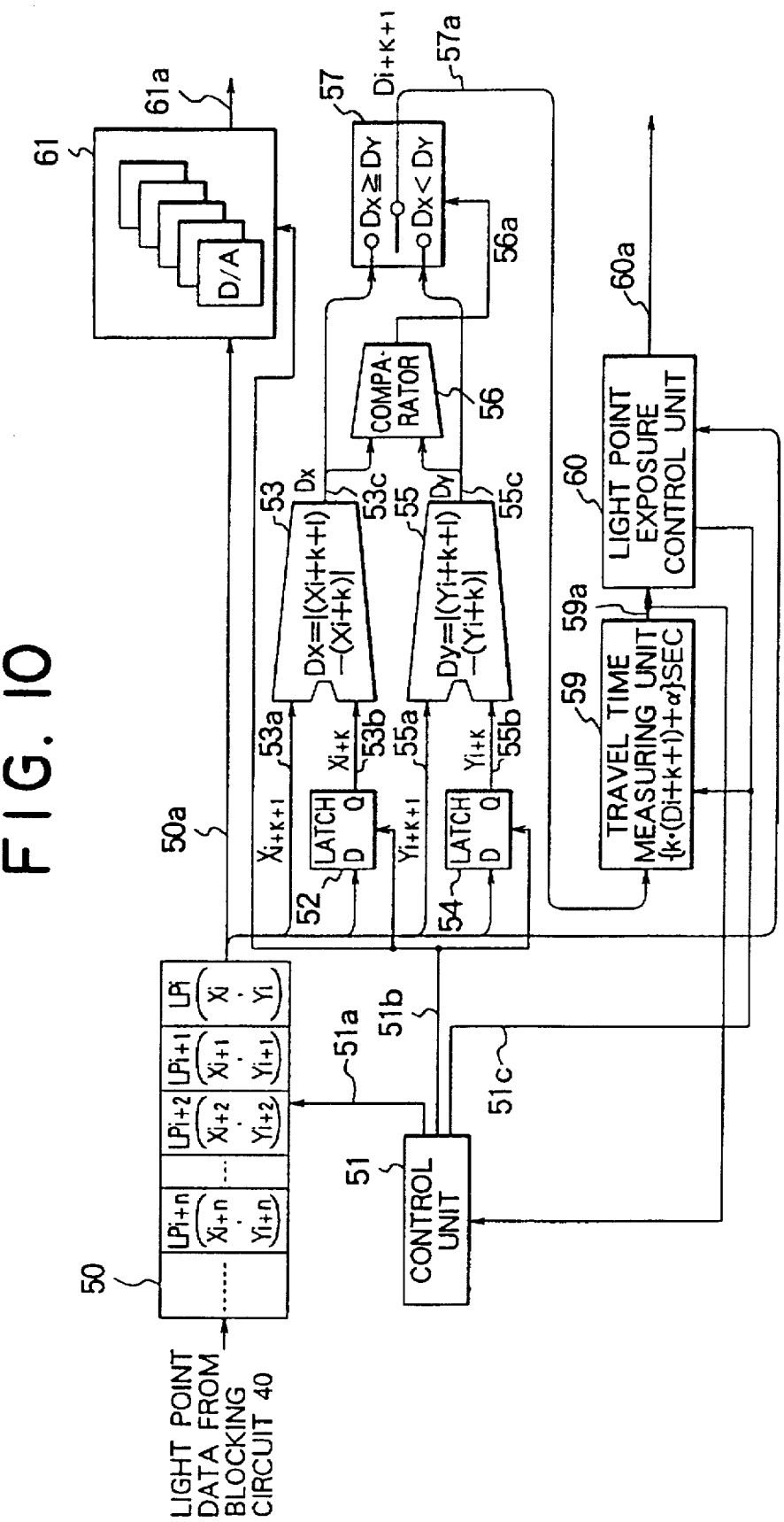
FIG. 10 is a block diagram showing an embodiment of a light point travel control unit included in the embodiment shown in FIG. 4.
Figure 11:
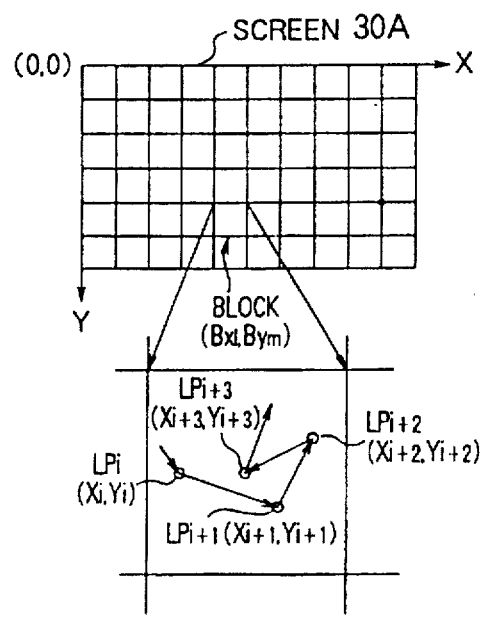
FIG. 11 is a view showing a display example for illustrating an operation of the light point travel control unit shown in FIG. 10.
Figure 12:
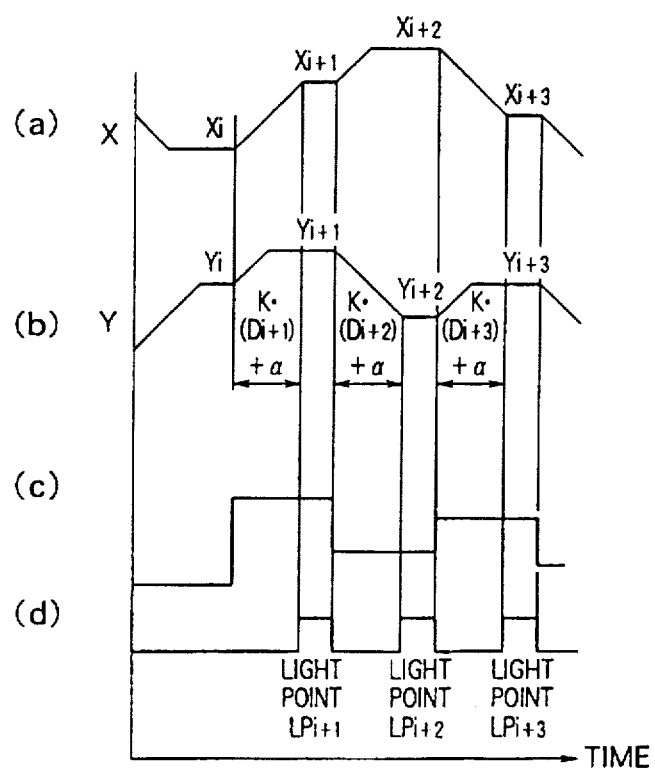
FIG. 12 is a view showing a signal waveform in each part of the light point travel control unit for illustrating how the light point travel control unit shown in FIG. 10 operates.

In turn, the description will be oriented to the arrangement and the operation of an embodiment of the light point travel control unit 35 included in the embodiment shown in FIG. 4 with reference to FIGS. 10 to 12. FIG. 10 is a block diagram showing an arrangement of the light point travel control unit 35 according to an embodiment of the present invention. The light point travel control unit 35 provides a function of measuring a light point travel time (a time taken until a electronic beam of the display unit is made stable/a time taken until a deflected voltage for driving the electronic beam is made stable) required for traveling from the current light point location on the screen to the next location in the random scan display according to the random-scan system, and controlling an exposure timing (timing on which the electronic beam is applied) for illuminating the light point and an exposure time duration (a duration of applying the electronic beam, that is, luminance) a certain time later. Further, the light point travel control unit 35 also has a function of converting the light point data (X and Y coordinates for pointing to the display location, size, and color) from digital to analog data.

Number 50 denotes an FIFO (First-in/First-out) memory for storing the light point data sent from the blocking circuit in the arriving sequence. Number 52 or 54 represent latch circuits for temporarily storing the X and Y coordinates contained in the light point data (LPi+k), respectively. Numbers 53 and 55 indicate travel distance calculators for taking differences between the X and Y coordinates from the memory 50 and differences between the X and Y coordinates from the latch circuits 52 and 54 and deriving each absolute value of the differences as travel distances on the X axis and the Y axis. Number 56 denotes a comparator for comparing the distance on the X axis with the distance on the Y axis and outputting the compared result. Number 57 denotes a selector for passing a larger value of both of the absolute values based on the compared result of the comparator 56. Number 59 denotes a travel time measuring unit for measuring a light point travel time which is obtained by the expression of K (Di+k+1)+α in which the constants K and α defined on the characteristics of the electronic beam control system of the display unit 30 and the travel distance of Di+k+1. Number 60 denotes a light point exposure control unit for controlling the exposure timing and the time duration of the light point. The exposure control unit operates to control an exposure duration and a light point luminance based on luminance information in the light point data. Number 61 denotes a digital-to-analog converter for converting the light point data into the analog data. Number 51 denotes a control unit for controlling each of the components.

Later, the description will be oriented to the operation of the light point travel control unit 35 with reference to FIGS. 11 and 12, in which FIG. 11 shows how the light points are defined on the screen coordinate system and FIG. 12 shows main signal and timing outputs from the light point travel control unit.

In addition, though the number of blocks on the screen shown in FIG. 11 is set as 60 as an example, it is 12 if the light point travel control unit 35 shown in FIG. 10 is connected to the blocking circuit 40 shown in FIGS. 6 and 7.

The light points LPi, LPi+1, LPi+2 and LPi+3 belonging to the block (Bxl, Bym) of FIG. 11 have as their respective coordinate values (Xi, Yi), (Xi+1, Yi+1), (Xi+2, Yi+2) and (Xi+3, Yi+3). Those light point data are arranged to be output from the blocking circuit 40 in the described sequence. The light point data (X and Y coordinate values indicating a location on the screen, size, and color) is temporarily stored in the FIFO memory 50. When the FIFO memory 50 stores the data, the control unit 51 feeds a control signal 51a to the FIFO memory 50 so as to read one piece of light point data from the FIFO memory 50 and feed it to a digital-to-analog converter 61 for converting the data into analog data.

Then, the X coordinate Xi+k+1 and the Y coordinate Yi+k+1 of the light point data (LPi+k+1) are applied to the X travel distance calculator 53 and an input unit of the X latch circuit 52 and the Y travel distance calculator 55 and an input unit of the Y latch circuit 54, respectively. At this time, the X latch circuit 52 and the Y latch circuit 54 hold the X coordinate value Xi+k and the Y coordinate value Yi+k of the light point data (LPi+k) immediately preceding to the above data, respectively. Those X and Y coordinate values are also fed to the other input units of the X travel distance calculator 53 and the Y travel distance calculator 55, respectively. In receipt of these data, the X travel distance calculator 53 and the Y travel distance calculator 55 operate to calculate the X-axial travel distance Dx=|(Xi+k+1)−(Xi+k)| and the Y-axial travel distance Dy=|(Yi+k+1)−(Yi+k)|, respectively. These X-axis and Y-axis travel distances Dx and Dy are sent to the comparator 56 and the selector 57. The comparator 56 serves to compare the distances Dx and Dy with each other in magnitude and feed the compared result as a control signal 56a to the selector 57. The selector 57 serves to select and output a larger travel distance according to the control signal 56a. The output travel distance is given to the travel time measuring unit 59. The distance serves as travel distance information 57a (Di+k+1) used for changing the light point data (LPi+k) having the coordinate values (Xi+k, Yi+k) on the current location to the light point data having the coordinate values (Xi+k+1, Yi+k+1) on the next location. The travel time measuring unit 59 obtains a travel time of the next light point LPi+k+1 to the display location based on the information 57a as K(Di+k+1)+α. Then, to display this next light point, the measuring unit 59 serves to output a light point exposure trigger signal 59a to the light point exposure control unit 60. In response to the signal 59a, the light point exposure control unit 60 outputs a control signal 60a to the display unit 30 through a data multiplexer 36. The control signal 60a is used for controlling an exposure timing of the light point or an exposure time duration.

As a result of this operation, the next light point is displayed.

Further, when the control unit 51 detects this exposure trigger signal 59a, the unit 51 reads the next light point data LPi+k+2 from the FIFO memory 50. Then, the subsequent operation is the same as described above.

The operation and measurement of the travel time (Di+k+1) of the light point based on a larger one of the travel distances Dx and Dy needs to set a larger time required for traveling the display location of the light point in the X-axial and Y-axial directions of the next light point location on the screen to the travel time of the light point to the next display location.

In FIG. 12, Di+1, Di+2 and Di+3 correspond to |Xi+1−Xi|, |(Yi+2)−(Yi+1)|, and |(Xi+3)−(Xi+2)|, respectively.

The symbol LPk (Xk, Yk) in the FIFO memory 50 of FIG. 10 points to the k-th light point data located at (Xk, Yk).

Figure 13:
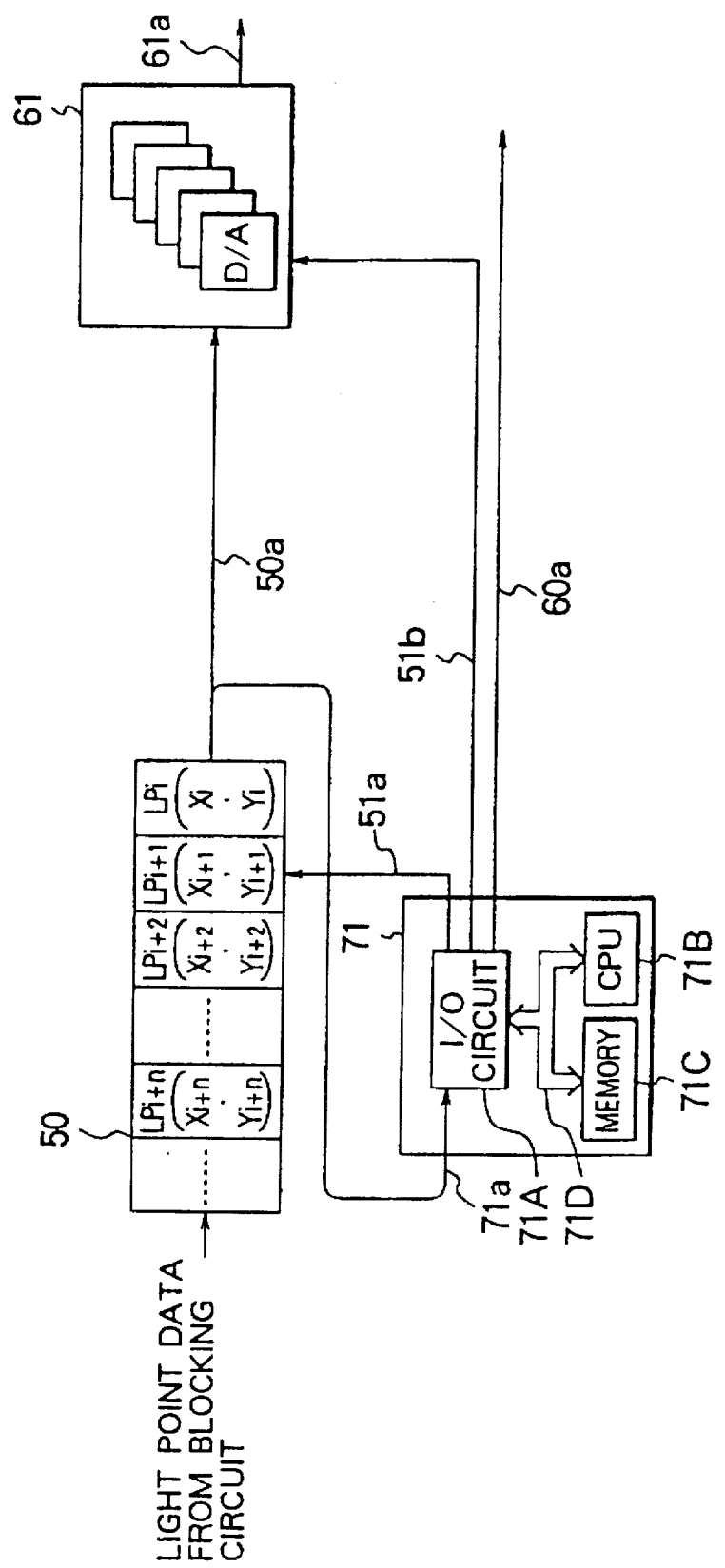
FIG. 13 is a block diagram showing an arrangement of transformation of the light point travel control unit shown in FIG. 10.

FIG. 13 is a block diagram showing a transformation of the light point travel control unit 35 shown in FIG. 10. In this transformation, the functions of the X latch circuit 52, the Y latch circuit 54, the X travel distance calculator 53, the Y travel distance calculator 55, the comparator 56, the selector 57, the travel time measuring unit 59, and the light point exposure control unit 60 are replaced with a processor 71, such as a microprocessor or a digital signal processor. That is, those functions are realized by the software. The components having the same number and symbols as those shown in FIG. 10 have the same function. 71a denotes the light point data (LPi+k+1) read out of the FIFO memory 50 in response to the control signal 51a.

Figure 14:
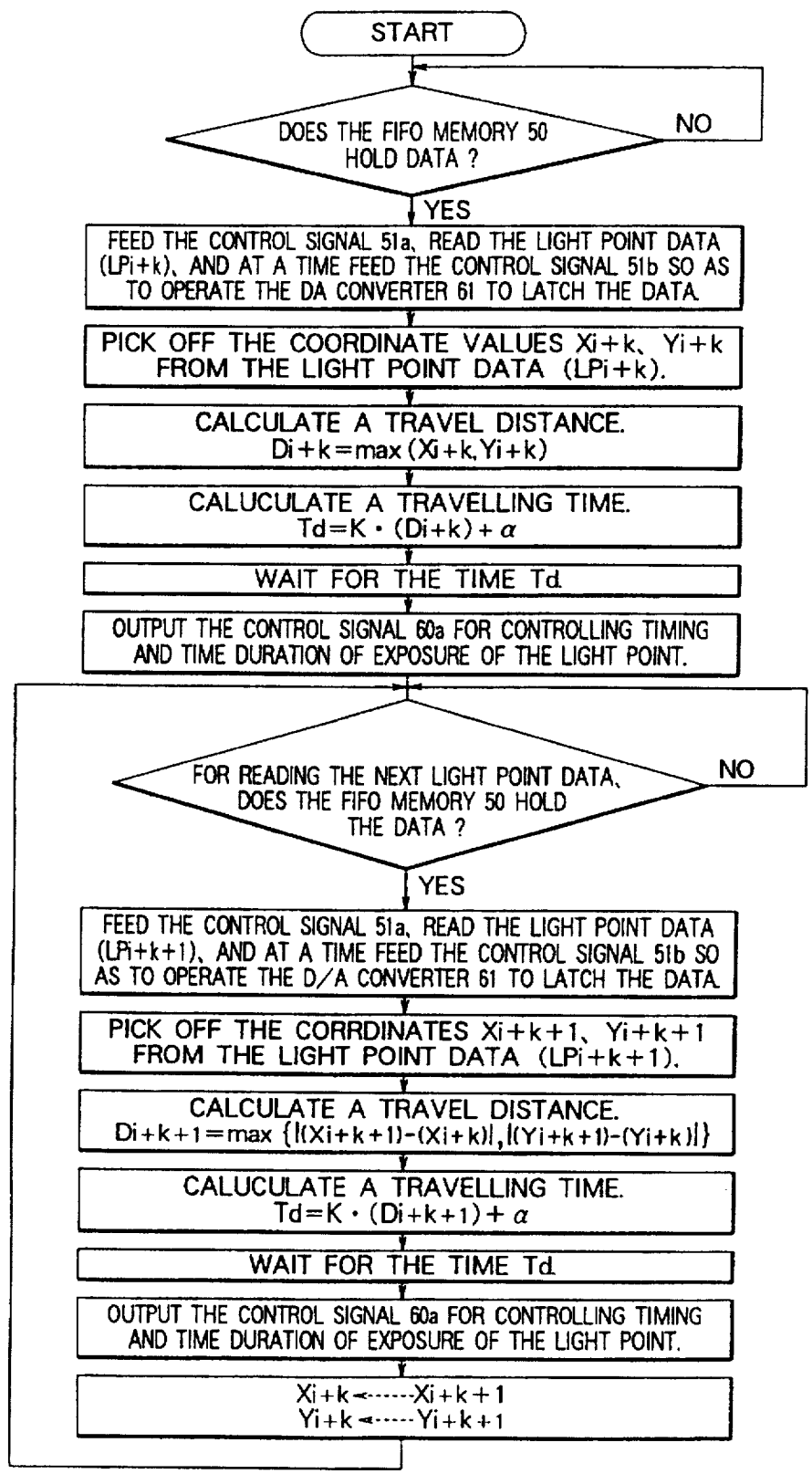
FIG. 14 is a flowchart for illustrating an operation of the light point travel control unit shown in FIG. 13.

The processor 71 includes an I/O control circuit 71A, a central processing unit (CPU) 71B, a memory 71C and a bus 71D connecting them with one another. The operation of the light point travel control unit 35 is the same as that shown in FIG. 10. Hence, though the operation is shown in the flowchart of FIG. 14, it is not described herein. In this flowchart, the light point data is read by the processor 71. In place, the data to be read may be restricted as only the X and Y coordinate values.

Figure 15:
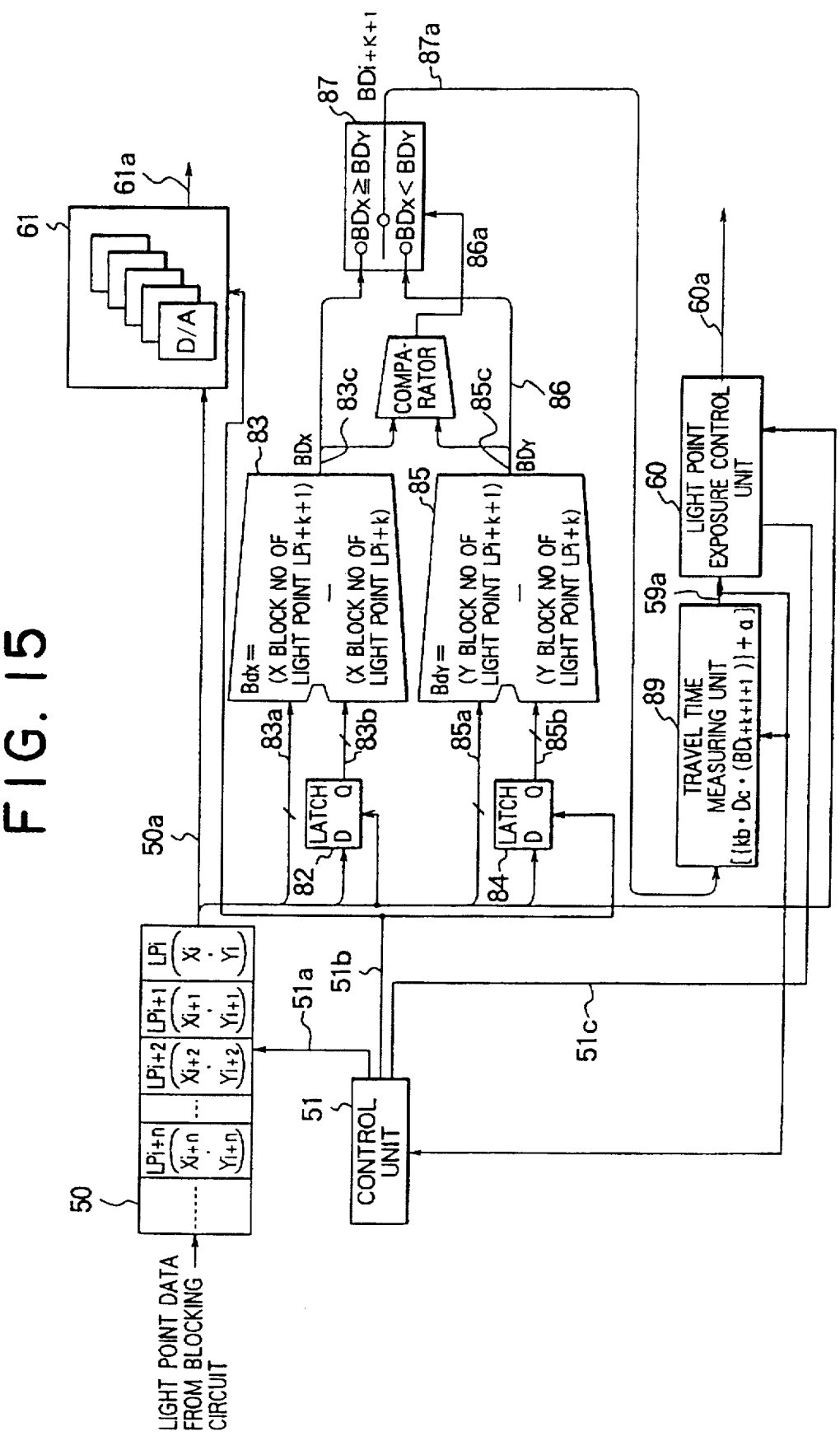
FIG. 15 is a block diagram showing another embodiment of the light point travel control unit included in the embodiment shown in FIG. 4.
Figure 16A:
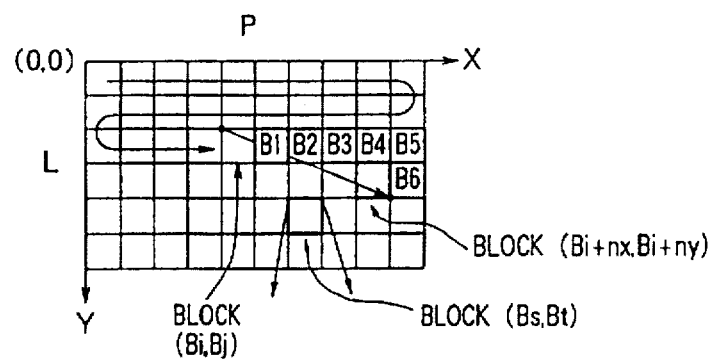
FIG. 16 is a view showing a display example for illustrating how the light point travel control unit shown in FIG. 15 operates.
Figure 16B:
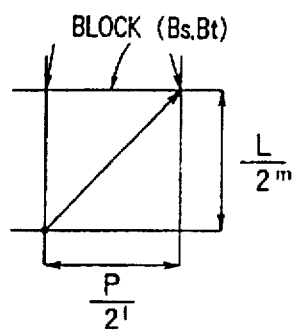
Figure 17:
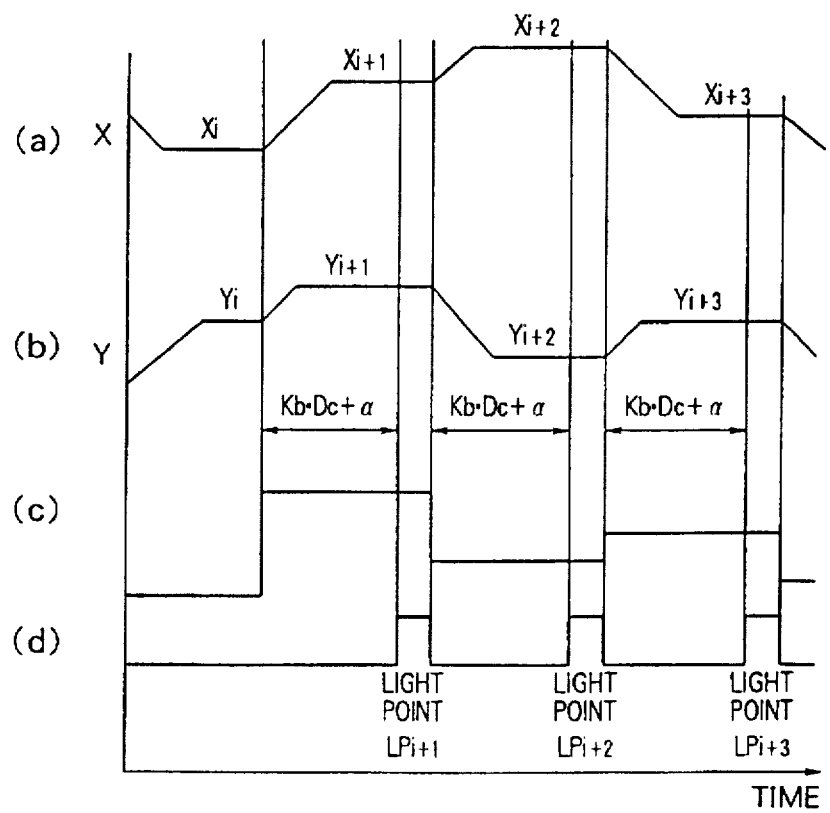
FIG. 17 is a view showing a signal wave-format each part of the light point travel control unit, for illustrating how the light point travel control unit shown in FIG. 15 operates.

Next, the description will be oriented to an arrangement and an operation of another embodiment of the light point travel control unit 35 included in the embodiment of FIG. 4 with reference to FIGS. 15 to 17. FIG. 15 is a block diagram showing an arrangement of another embodiment of the light point travel control unit 35. FIG. 16 shows a size of each block formed by dividing the display area of the display unit and an example of travel of a display location between blocks. FIG. 17 is a view showing a signal waveform of each component of the light point control unit for describing the operation of the light point travel control unit shown in FIG. 15. The light point travel control unit 35 shown in FIG. 10 is arranged to calculate the light point travel time based on the coordinate values on the screen, while the light point travel control unit 35 shown in FIG. 15 performs the same calculation based on the same bit information as the upper l and m bits of the X and Y coordinate values employed by the blocking circuit 40 located at the previous stage.

As shown in FIG. 16, assuming that the display resolution of the light point is L×P (L and P are vertical and horizontal sizes of the display screen), the size of one block is $(L/2^m) \times (P/2^l)$. The maximum travel distance of the light point inside of this block corresponds to the travel distance of the light point between the terminals on a diagonal line of the block. The maximum travel distance Dc in this case is Dc=max $(L/2^m, P/2^l)$. That is, Dc is a larger one of the vertical size $L/2^m$ and the horizontal size $P/2^l$.

If the travel time of each light point in all the blocks are set as a constant of {Kb·Dc+α} second (in which Kb and α are constants defined by characteristics of an electronic beam control system of the display unit), for example, if no light points to be displayed are provided in the blocks B1, B2, ..., B6 of FIG. 16, the electronic beam is allowed to directly travel from the block (Bi, Bj) to the block (Bi+nx, Bj+ny). That is, the travel time of the light point from the block (Bi, Bj) to (Bi+nx, Bj+ny) in this case is defined as follows. Assuming that the number BD of moving blocks is a larger one of the number of the X-axial moving blocks and the number of the Y-axial moving blocks, the light point travel time is derived by the expression of [Kb·Dc·(BD+1)+α]. This makes it possible to reduce the hardware amount of a latch circuit for latching display coordinate values of FIG. 10 and an operating circuit and bus signal lines.

In FIG. 15, the components having the same number and symbols are those shown in FIG. 10 function similarly. 82 and 84 denote latch circuits for latching the upper l and m bits (indicating the block number) of the X and the Y coordinate values of the display location of the light point data (LPi+k) read out of the FIFO memory 50, respectively. 83 and 85 denote travel block number calculators for taking absolute values of differences between the previous block location to the current block location on the X and the Y coordinate values and obtaining the numbers of moving blocks (travel distance) on the X and the Y axes, respectively. 86 denotes a comparator for comparing the number of moving blocks on the X axis with the number of moving blocks on the Y axis in magnitude. 87 denotes a selector for passing a larger one of the number of moving blocks on the X axis and the number of moving blocks on the Y axis according to the compared result of the comparator 86. 89 denotes a travel time measuring unit for measuring a light point travel time (time taken until the electronic beam of the display unit 30 is made stable/time taken until the deflected voltage for driving the electronic beam is made stable) derived by the expression of [Kb·Dc·{(BDi+k+l)+1}+α] in which the constants Kb and α are defined by the characteristics of the electronic beam control system of the display unit 30 and the number of moving blocks is BDi+k+l.

The operation of the light point travel control unit is the same as that shown in FIG. 10. Hence, the operation is not described. FIG. 17 shows the main signals and the timings for the light points LPi, LPi+1, LP+2 and LPi+3 inside of the block (Bxl, Bym) of FIG. 11. Since the travel is done inside of the block, the interblock travel distance BDi+k+l is made zero. Hence, the light point travel time is {Kb·Dc·(BDi+k+l)+α}=Kb·Dc+α.

In order to realize the functions of the X latch circuit 82, the Y latch circuit 84, the X-axial travel block number calculator 83, the Y-axial travel block number calculator 85, the comparator 86, the selector 87, the travel time measuring unit 89, and the light point exposure control unit 60 with the software, those components may be replaced with a processor like a microprocessor or a digital signal processor.

Figure 18:
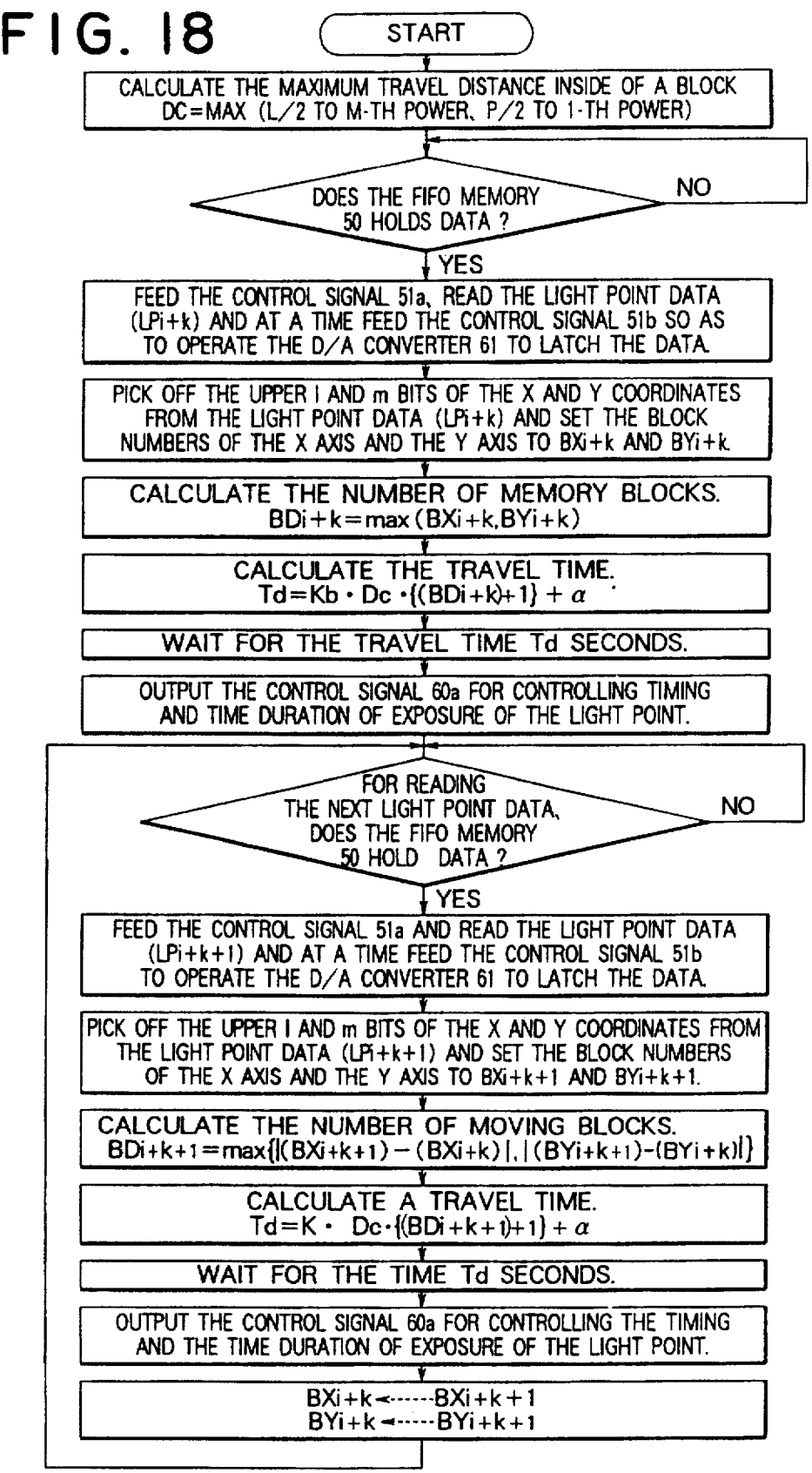
FIG. 18 is a flowchart for illustrating how a transformation of the light point travel control unit shown in FIG. 15 operates.

In this arrangement, the operation of the light point travel control unit 35 is the same as that as shown in FIG. 15. Hence, the operation is shown in the flowchart of FIG. 18 but is not described herein. In this flowchart, the light point data is read by the processor. In place, the data to be read may be restricted as only the upper l bits of the X coordinate value of the light point data and the upper m bits of the Y coordinate value.

As described above, the present invention suitably applies to the random-scan system. If the size of a display point is larger than a predetermined one, only the point may be displayed according to the raster-scan system. That is, the present invention may apply to the equipment arranged to display the image according to random-scan system though the part is represented according to the raster-scan system.

According to the present invention, the processing time is reduced in displaying image data according to the random-scan system. Conversely, the number of image data to be displayed per unit time is increased. This results in making it possible to display a more realistic image with fidelity. The present invention is especially effective when applied to the image display for a car or airplane simulating equipment, for example.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A system for controlling an image data display for image data created by a computer on a screen of a display unit operated according to a random-scan system, comprising:

a memory having a plurality of memory blocks for storing said image data;

writing control means for allocating each of a plurality of image data created sequentially and independently in association with a display position on said screen by said computer to one of a plurality of predetermined blocks divided based on display coordinate data added to the image data and storing the allocated image data in said memory blocks as keeping the allocation;

reading control means for sequentially reading said image data stored in said memory blocks from adjacent memory blocks, regardless of the order in which said image data is written into said memory blocks, based on coordinates of the display screen; and display control means for controlling display timing of said image data such that scanning performed in the random-scan system is based upon the sight-point coordinate data corresponding to said image data so as to display the read image data according to the random-scan system in said display unit.

2. A system for controlling display of image data as claimed in claim 1, wherein the random-scan system is predicated upon a travel time for an electronic beam to pass from one display location to another, therefore said display control means includes travel time calculating means for calculating the travel time required for the electronic beam to travel from a display location of preceding image data to another display location of current image data on said display unit, based on the display coordinate data added to current image data and the display coordinate data added to said preceding image read from said reading means; and means for controlling said display timing for displaying said current image data after the calculated travel time has passed.

3. A system for controlling display of image data as claimed in claim 2, wherein said travel time calculating means uses, for calculating the travel time, a larger one of an absolute value of a) a difference between an X-axis coordinate of the display coordinate data added to said preceding image data and an X-axis coordinate of the display coordinate data added to said current image data and b) an absolute value of a difference between a Y-axis of the display coordinate data added to said proceeding image data and a Y-axis of the display coordinate data added to said current image data.

4. A system for controlling display of image data as claimed in claim 2, wherein said plurality of blocks respectively correspond to each area formed by dividing said display screen, and said travel time calculating means calculates said travel time based on the maximum value of time required for an electronic beam to travel inside the block of said display screen provided in said display unit.

5. A system for controlling display of image data as claimed in claim 4, wherein said travel time calculating means uses, for calculating said travel time, a larger one of a) a difference of a number of blocks on the X axis and b) a difference of a number of blocks on the Y axis, between a block belonging to the display coordinate data added to said current image data and a block belonging to the display coordinate data added to said preceding image data, if the display coordinate data added to said current image data belongs to a different block from the display coordinate data added to said preceding image data.

6. A system for controlling display of a plurality of image data created by a computer on a screen of a display unit utilizing a random-scan system, comprising:

a memory having a plurality of memory blocks for storing said plurality of image data, all of said image data having display coordinate data which are generated sequentially and independently in association with respective display positions on said screen by said computer, writing control means for allocating each of said plurality of image data to one of a plurality of predetermined blocks divided based on said display coordinate data added to each of said plurality of image data and for storing said allocated image data corresponding to said plurality of blocks into memory blocks, an order of said plurality of image data to be stored in said memory blocks being arranged so that said plurality of image data to be closely displayed are placed continuously in a writing order of said memory;

reading control means for reading said plurality of image data stored in said memory blocks and displaying said plurality of image data thus read on said display unit; and display control means for controlling display timing of the image data such that scanning performed in the random-scan system is based upon the light-point coordinate data corresponding to said image data so as to display the read image data according to the random-scan system in said display unit.

7. A system for controlling display of image data as claimed in claim 6, wherein the random-scan system is predicated upon a travel time for an electronic beam to pass from one display location to another, therefore said display control means includes travel time calculating means for calculating the travel time required for the electronic beam to travel from a display location of preceding image data to another display location of current image data on said display unit, based on the display coordinate data added to current image data and the display coordinate data added to said preceding image read from said reading means; and means for controlling said display timing for displaying said current image data after the calculated travel time has passed.

8. A system for controlling display of image data as claimed in claim 7, wherein said travel time calculating means uses, for calculating the travel time, a larger one of an absolute value of a) a difference between an X-axis coordinate of the display coordinate data added to said preceding image data and an X-axis coordinate of the display coordinate data added to said current image data and b) an absolute value of a difference between a Y-axis of the display coordinate data added to said proceeding image data and a Y-axis of the display coordinate data to said current image data.

9. A system for controlling display of image data as claimed in claim 7, wherein said a plurality of blocks respectively correspond to each area formed by dividing said display screen, and said travel time calculating means calculates said travel time based on the maximum value of time required for an electronic beam to travel inside of the block of said display screen provided in said display unit.

10. A system for controlling display of image data as claimed in claim 9, wherein said travel time calculating means uses, for calculating said travel time, a larger one of a) a difference of a number of blocks on the X-axis and v) a difference of a number of blocks on the Y-axis, between a block belonging to the display coordinate data added to said current image data and a block belonging to the display coordinate data added to said preceding image data, if the display coordinate data added to said current image data belongs to a different block from the display coordinate data added to said preceding image data.

11. A system for controlling display of image data as claimed in claim 6, wherein said writing control means includes means for counting the number of image data written in the blocks, and said reading control means includes means for counting the remaining number of image data written in the blocks and means for completing the reading operation in response to the remaining number.

12. A method for controlling an image data display for image data created by a computer on a screen of a display unit utilizing a random-scan system, said method comprising the steps of:

allocating each of a plurality of image data sequentially created by said computer to any one of a plurality of blocks based on display coordinate data added to said image data;

storing the allocated image data in a memory;

reading said image data stored in said memory in a predetermined manner such that only blocks in which image data is stored and which are directly adjacent to one another on the screen of the display unit will be read in sequence, thereby minimizing reading time; and displaying the sequentially read image data on the screen, such that scanning performed in the random-scan system is based upon the light-point coordinate data corresponding to said image data.

13. A system for controlling an image data display for image data created by a computer on a screen of a display unit operated according to a random-scan system, comprising:

a memory for storing said image data;

writing control means for allocating each of a plurality of image data sequentially created by said computer to any one of a plurality of blocks based on display coordinate data added to the image data and storing the allocated image data in said memory as keeping the allocation;

reading control means for sequentially reading said image data stored in said memory in a predetermined manner such that only blocks in which image data is stored and which are directly adjacent to one another on the screen of the display unit will be read in sequence, thereby minimizing reading time; and display control means for controlling display timing of the image data such that scanning performed in the random-scan system is based upon the light-point coordinate data corresponding to said image data so as to display the read image data according to the random-scan system in said display unit.

14. A system as claimed in claim 13, wherein said memory comprises a first memory portion for storing said image data and a second memory portion for storing said allocated image data.

15. A method for controlling an image data display for image data created by a computer on a screen of a display unit utilizing a random-scan system, said method comprising the steps of:

allocating each of a plurality of image data sequentially created by said computer to any one of a plurality of blocks based on display coordinate data added to said image data;

storing the allocated image data in a memory;

reading said image data stored in said memory in a predetermined serpentine manner such that only blocks in which image data is stored and which are directly adjacent to one another on the screen of the display unit will be read in sequence, thereby minimizing reading time; and displaying the sequentially read image data on the screen, such that scanning performed in the random-scan system is based upon the light-point coordinate data corresponding to said image data.

16. A system for controlling an image data display for image data created by a computer on a screen of a display unit operated according to a random-scan system, comprising:

a memory for storing said image data;

writing control means for allocating each of a plurality of image data sequentially created by said computer to any one of a plurality of blocks based on display coordinate data added to the image data and storing the allocated image data in said memory as keeping the allocation;

reading control means for sequentially reading said image data stored in said memory from adjacent blocks in a predetermined serpentine manner such that only blocks in which image data is stored and which are directly adjacent to one another on the screen of the display unit will be read in sequence, thereby minimizing reading time; and display control means for controlling display timing of the image data such that scanning performed in the random-scan system is based upon the light-point coordinate data corresponding to said image data so as to display the read image data according to the random-scan system in said display unit.

17. A method for controlling an image data display for image data created by a computer on a screen of a display unit utilizing a random-scan system, the random-scan system is predicated upon a travel time for an electronic beam to pass from one display location to another said method comprising the steps of:

processing the image data by geometry transformation or rendering;

allocating each of a plurality of image data sequentially created by said computer to any one of a plurality of blocks based on display coordinate data added to said image data;

storing the allocated image data in a memory;

reading said image data stored in said memory in sequence from adjacent blocks on the screen;

assessing travel time information for the electronic beam corresponding to said sequentially read image data to travel from one light point location to a next light point location; and displaying the sequentially read image data on the screen based on the assessed travel time information such that scanning performed in the random-scan system is based upon the light-point coordinate data corresponding to said image data.

18. A system for controlling an image data display for image data created by a computer on a screen of a display unit operated according to a random-scan system, the random-scan system is predicated upon a travel time for an electronic beam to pass from one display location to another comprising:

processing means for processing the image data by geometry transformation or rendering;

a memory for storing said image data;

writing control means for allocating each of a plurality of image data sequentially created by said computer to any one of a plurality of blocks based on display coordinate data added to the image data and storing the allocated image data in said memory as keeping the allocation;

reading control means for sequentially reading said image data stored in said memory from adjacent blocks based on coordinates of the display screen;

means for assessing travel information for the electronic beam corresponding to said sequentially read image data to travel from one light point location to a next light point location; and display control means for controlling display timing of the image data based on the time travel information so as to display the read image data according to the random-scan system in said display unit, such that scanning performed in the random-scan system is based upon the light-point coordinate data corresponding to said image data.

* * * * *